July 2, 1963 W. J. PICK 3,095,652
MEANS FOR ANALYZING INVOLUTE GEAR PROFILES
Filed Aug. 11, 1959 2 Sheets-Sheet 1
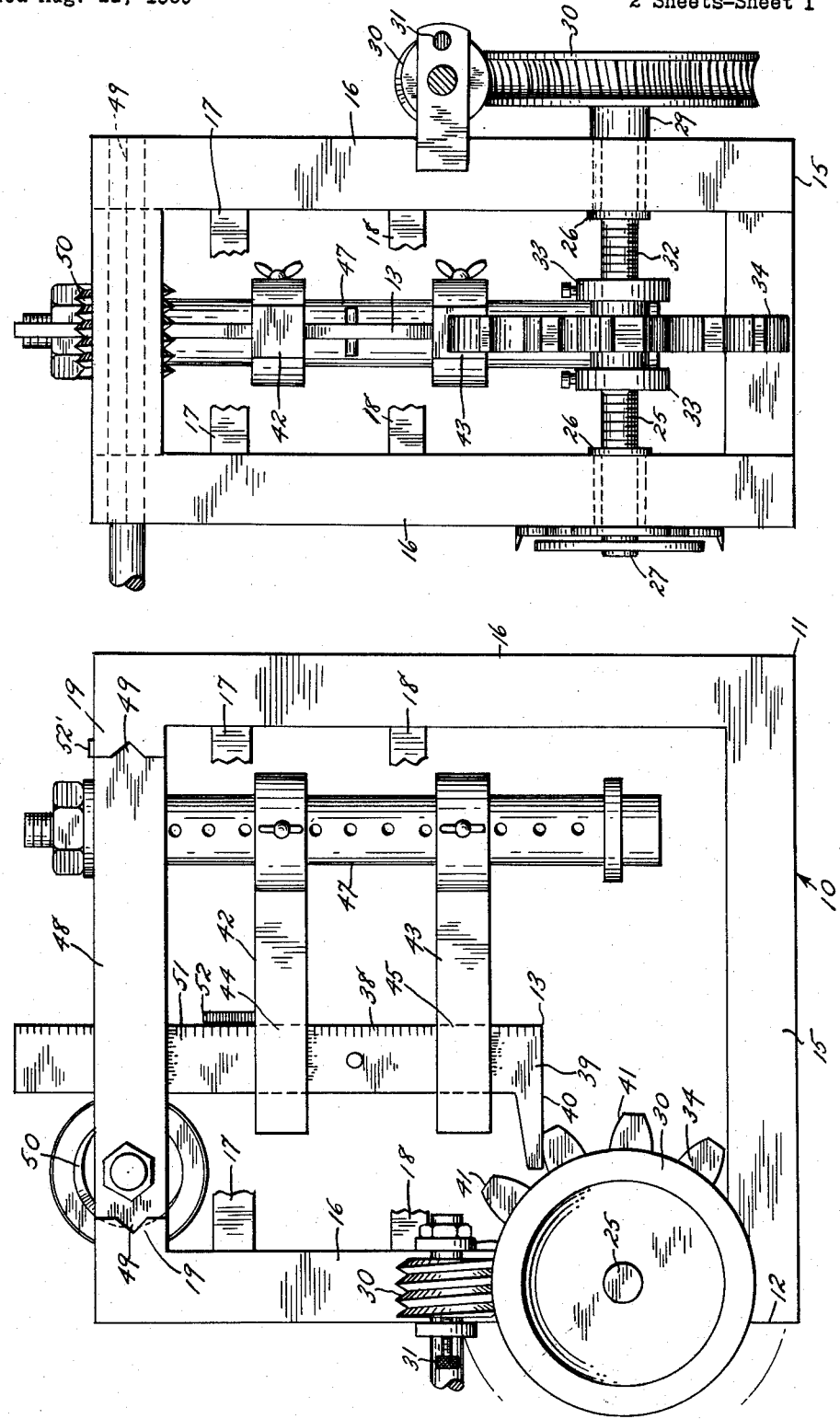

July 2, 1963   W. J. PICK   3,095,652
MEANS FOR ANALYZING INVOLUTE GEAR PROFILES
Filed Aug. 11, 1959   2 Sheets-Sheet 2
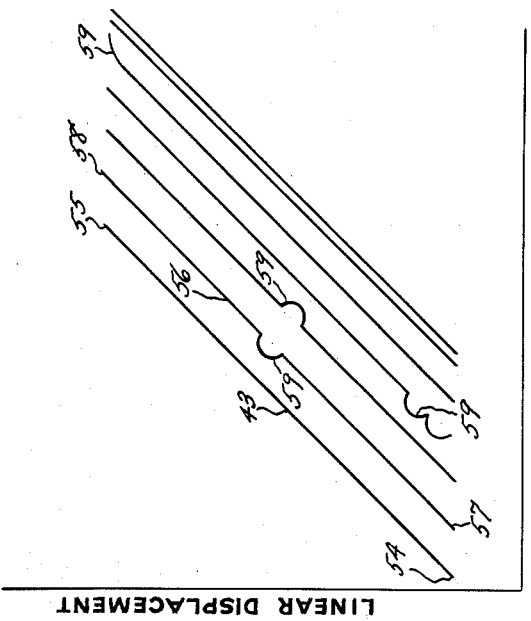
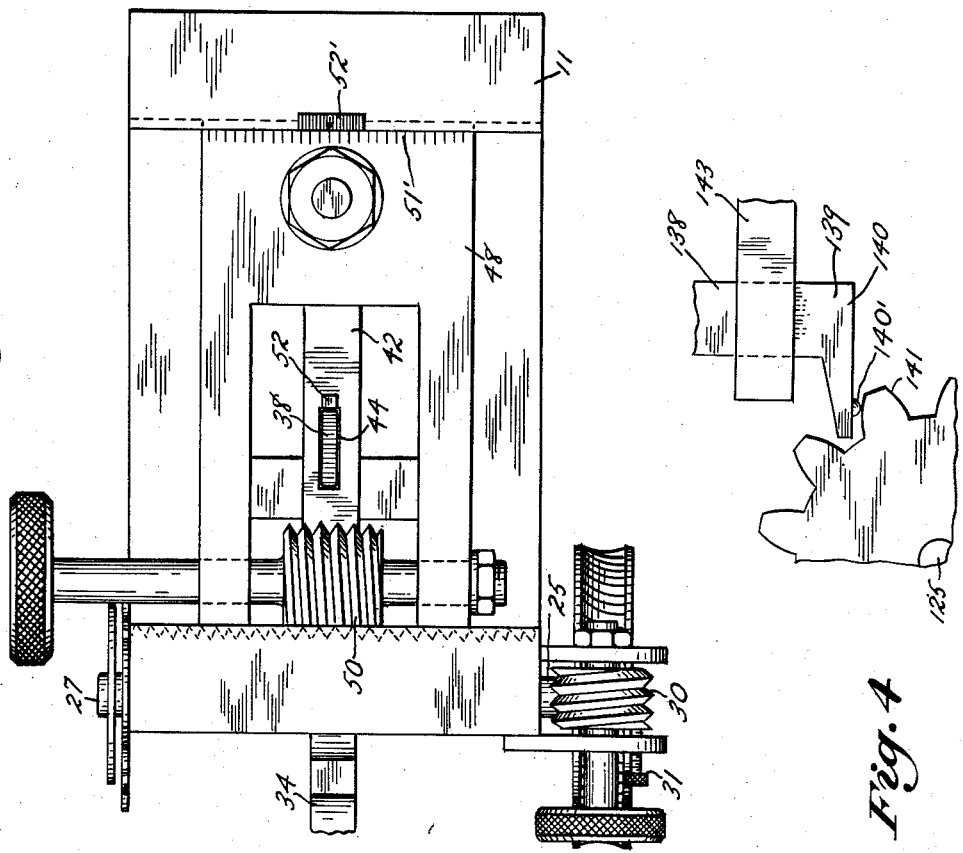

United States Patent Office 3,095,652
Patented July 2, 1963

3,095,652
MEANS FOR ANALYZING INVOLUTE GEAR
PROFILES
William J. Pick, 163 E. St. Marks Place,
Valley Stream, N.Y.
Filed Aug. 11, 1959, Ser. No. 832,935
1 Claim. (Cl. 33—179.5)

This invention relates generally to the field of gear tooth profile analysis, and more particularly to an improved device possessed of extreme accuracy while employing relatively few movable parts. Devices of this type are broadly known in the art, and the invention lies in specific constructional details permitting an improved result heretofore unobtainable in the prior art. The involute profile may be on a working gear, a master gear, a cam, a gear-cutting hob, a gear-cutting shaper, or any other application.

In general, prior art devices have suffered from two principal disadvantages, namely, high cost of manufacture, and relative inaccuracy. The first disadvantage has resulted from the use of a large number of moving parts, which almost invariably have employed pivotal movements about a fixed point, where minor errors of the fourth decimal place cumulate to produce the second mentioned disadvantage. In some devices, obtained measurements are translated into measurements of electrical potential, or movement of dial gauges, where opportunity for further inaccuracy occurs. Very few of the prior art devices have provided means for substantially complete analysis of a gear tooth profile, most of such devices being suitable only for a partial analysis, other devices being employed to complete the analysis.

It is among the principal objects of the present invention to provide a simple means for substantially completely analyzing a gear tooth profile of involute type, in which the above-mentioned disadvantages are substantially eliminated.

Another object of the invention lies in the provision of an improved involute analyzing means in which pivotal interconnections of feeler members and other parts have been completely eliminated, all moving parts exhibiting pure translational or pure rotational movement in one or more planes.

Still another object of the invention lies in the provision of an improved involute tooth profile analyzing device in which the cost of fabrication may be substantially less than comparable devices existing in the prior art, while yet producing a degree of accuracy far superior to that obtainable in such prior art devices.

Yet another object of the invention lies in the provision of an improved gear tooth analyzing means of the class described and possessed of the above-mentioned advantages which may be operated in conjunction with a wide variety of linear measurement systems, as for example, Wheatstone bridge circuits, air gauges, linear potentiometers, and the like.

A feature of the invention lies in the ability of the device to determine a wide variety of errors during a course of a single series of measurements, the device resolving the errors into individual components, as is desirable from both performance and manufacturing viewpoints.

Another feature of the invention lies in the small size of the device as contrasted with sizes of gears which may be measured by the device.

These objects and features, as well as other incidental ends and advantages will become more clearly apparent in the course of the following disclosure, and be pointed out in the appended claim.

In the drawings, to which reference will be made in the specification, similar reference characters have been employed to designate corresponding parts throughout the several views.

FIGURE 1 is a side elevational view of an embodiment of the invention.
FIGURE 2 is an end elevational view thereof.
FIGURE 3 is a plan view thereof.
FIGURE 4 is an alternate form of feeler element which comprises a part of the embodiment.
FIGURE 5 is an exemplary graph compiled by measurements obtained from the embodiment, and from which analysis may be made.

In accordance with the invention, the device, generally indicated by reference character 10, comprises broadly: a rigid frame element 11, gear supporting and rotating means 12, and a movable feeler element 13.

The frame element may be of any suitable construction, although in the interest of rigidity, the same preferably cast as a single integral piece of relatively lightweight metals. It includes a plurality of base members 15 adapted to be supported upon a table or other horizontal support (not shown), four vertically disposed frame members 16, four upper horizontally disposed frame members 17, and suitable horizontally disposed cross braces 18 when needed for additional rigidity. Formed integrally with two oppositely disposed upper frame members 17 are a pair of guideway members 19 which support the feeler element 13.

The gear supporting and rotating means 12 include an elongated shaft member 25 positioned within journals 26 formed into adjacent vertical frame members 16. A first end 27 of the shaft 25 projects outwardly of the frame element 11 and is provided with vernier circle means of a type similar to that employed in surveying theodolites or transits, but preferably with a higher degree of accuracy. In the alternative, other accurate means of measuring rotation, such as but not limited to, a dividing head, or electrical potentiometer (not shown) may be used. The second end 29 is provided with worm gear drive means 30 having locking means 31 for fixing any given angular adjustment of the shaft member 25. The outer surface 32 of the shaft member 25 is preferably threaded, and provided with lock nuts 33 for maintaining a gear 34 to be tested in fixed relative position upon the shaft 25. The gear 34 must accurately fit the shaft 25, preferably as a press fit, since eccentricity due to the fit of the gear will be indicated and cannot be distinguished from eccentricity of the involute being measured.

The feeler element 13 is capable of pure translational movement in a plurality of planes relative to the gear 34. It includes an elongated shoe member 38 having a contact portion 39, the lower surface 40 of which is accurately polished and adapted to contact the profile 41 of a tooth of the gear 34. First and second support bars 42 and 43 are provided with rectangularly shaped openings 44 and 45, respectively, in which the shoe member 38 may reciprocate along a vertical axis. From a consideration of FIGURE 1, it will be apparent that the shoe member 38 may contact the involute profile of the gear 34 through the force of gravity, or if desired, resilient means (not shown) may be employed to increase this force. In the ideal situation, the force encountered when the gear is in actual use may be employed. The support bars 42 and 43 are in turn provided with adjustable mounting means for being positioned upon a vertically disposed supporting post 47. The post 47, in turn, is rigidly interconnected with a horizontally shiftable carriage 48 having guide engaging members 49 which are slidably reciprocable within the guiding members 19. Worm drive means 50 interconnects the carriage 48 with the frame element 11, to permit linear adjustment of the relative position therebetween.

The shoe member 38 is provided with calibrations 51 which are positionable opposite vernier calibrations 52 on the carriage 48, the calibrations 51—52 serving to indicate vertical lift of the shoe member 38 with respect to the carriage. Similar calibrations 51′ and 52′ indicate the relative position between the carriage 48 and the frame element 11.

In use, the gear 34 is properly positioned by means of lock members 33 upon the shaft member 25, and the support bars 42 and 43 are positioned vertically upon the supporting post 47 to position the shoe member 38 in a vertical location wherein the lower surface 40 of the contact portion 39 may rest upon a profile 41 of a gear tooth.

Referring to FIGURE 5, there is shown a graph obtained by plotting a series of points, angular displacement of the shaft member 25 against vertical lift of the shoe member 38. Because of the well known characteristic of an involute, an accurate cam profile will result in the points aligning themselves in a straight line as indicated by reference character 43, wherein the locus of points starts at a low point 54 and extends to a high point 55. Upon rotating the shaft member 25 after disengaging the shoe member 38, a second tooth profile may be plotted, as indicated by the second graph line 56 in FIGURE 3 which extends from a low point 57 to a high point 58. Deviations, generally indicated by reference character 59, indicate high points or low points on the cam profile, whereas the occurrence of an individual straight line which does not superimpose on the others indicates an error in tooth spacing. A pattern of straight lines in which successive teeth show lines further and further from a given tooth until halfway around gear, and then successively nearer and nearer to the given tooth indicates eccentricity error.

Skew error is determined by locking the shaft member 25 against rotation, and moving the carriage 48 along the guideway members 19, observing movement of the shoe member 38, and plotting movement of the carriage against movement of the shoe. A spur gear, if accurate, will produce a locus of points as a straight horizontal line, whereas a helical gear should produce an angularly disposed straight line.

In the alternate forms of feeler element shown on FIGURE 4, parts corresponding to those of the principal form have been designated by similar reference characters with the additional prefix "1." It will be observed that the surface 140 is provided with a narrow radius projection 140′ to increase the sensitivity of the device with regard to minor declivities in the surface of the gear profile.

It may thus be seen that I have invented novel and highly useful improvements in gear analysis devices, in which a feeler member is supported for pure translational movement which may be accurately measured using relatively simple means. Where desired, the vernier calibrations employed may be replaced by electrical or optical means, but in any case, the device may be formed with a minimum of complexity. By total elimination of pivotal joints, accuracy is maintained at an unusually high level, while cost of manufacture is at a correspondingly low level. Use of the device described in the specification can determine a large number of errors separately, namely involute form (tooth profile), runout (eccentricity), pitch (tooth spacing error) and skew.

I wish it to be understood that I do not consider the invention limited to the precise details of structure shown and set forth in this specification, for obvious modifications will occur to those skilled in the art to which the invention relates.

I claim:

A device for analyzing involute gear teeth profiles, comprising: a frame element, a shaft mounted for rotation about an axis passing through said frame element, said shaft having means for supporting a gear to be tested coaxially thereupon for rotation therewith, worm drive means mounted upon said frame element and selectively driving said shaft about its own axis through measured predetermined angular increments, locking means operating upon said worm drive means for selectively locking said worm drive means against movement with respect to said frame element; an elongated feeler element having a principal axis substantially perpendicular to said first-mentioned axis, and a shoe member extending laterally with respect to said last-mentioned axis to project into the path of the teeth of a gear mounted upon said shaft for testing thereby to selectively contact successive tooth profiles on said gear as said shaft is rotated; a carriage element slidably mounted upon said frame element for movement substantially at right angles with respect to the principal axis of said feeler element, post means mounted on said carriage element, worm drive means interconnecting said carriage element and said frame element for critically adjusting the relative positions therebetween, at least one support bar means connected to said post means and supporting said feeler element for translational displacement with respect to said frame element, and means on said support bar for measuring axial movement of said feeler element relative to said frame element.

References Cited in the file of this patent
UNITED STATES PATENTS

| | | |
|---|---|---|
| 1,533,671 | Steele | Apr. 14, 1925 |
| 2,195,810 | Matchett | Apr. 2, 1940 |
| 2,230,816 | Semar | Feb. 4, 1941 |
| 2,309,142 | Strafford | Jan. 26, 1943 |
| 2,697,283 | Leuthold | Dec. 21, 1954 |

FOREIGN PATENTS

| | | |
|---|---|---|
| 418,780 | Great Britain | Oct. 31, 1934 |
| 349,164 | Germany | Feb. 24, 1922 |

OTHER REFERENCES

Metal Working Production (MP) pp. 549–553, Mar. 28, 1958, 33–179.5